US012418805B2

(12) United States Patent
Zhou et al.

(10) Patent No.: US 12,418,805 B2
(45) Date of Patent: Sep. 16, 2025

(54) BEAM FAILURE DETECTION (BFD) BEHAVIOR AFTER RECEIVING BEAM FAILURE RECOVERY (BFR) RESPONSE

(71) Applicant: QUALCOMM Incorporated, San Diego, CA (US)

(72) Inventors: Yan Zhou, San Diego, CA (US); Yong Li, San Diego, CA (US); Yongle Wu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/022,730

(22) Filed: Sep. 16, 2020

(65) Prior Publication Data

US 2021/0092003 A1    Mar. 25, 2021

Related U.S. Application Data

(60) Provisional application No. 62/904,947, filed on Sep. 24, 2019.

(51) Int. Cl.
*H04L 12/24* (2006.01)
*H04L 5/00* (2006.01)
(Continued)

(52) U.S. Cl.
CPC ........ *H04L 41/0654* (2013.01); *H04L 5/0048* (2013.01); *H04L 41/0803* (2013.01); *H04W 72/23* (2023.01); *H04W 74/02* (2013.01)

(58) Field of Classification Search
CPC ................. H04B 7/0695; H04B 7/088; H04L 41/0654; H04L 41/0803; H04L 5/0048; H04W 72/14; H04W 74/02
See application file for complete search history.

(56) References Cited

U.S. PATENT DOCUMENTS

2020/0028652 A1*  1/2020  Bai .................. H04W 72/21

FOREIGN PATENT DOCUMENTS

WO    WO-2020092752 A1 *  5/2020  ........... H04B 7/0695

OTHER PUBLICATIONS

NTT Docomo ("Remaining issues on beam management", 3GPP TSG RAN WG1 Meeting #94; R1-1809138; Gothenburg, Sweden, Aug. 20-24, 2018) (Year: 2018).*

(Continued)

*Primary Examiner* — Asad M Nawaz
*Assistant Examiner* — Natali Pascual Peguero
(74) *Attorney, Agent, or Firm* — QUALCOMM Incorporated

(57) ABSTRACT

Certain aspects of the present disclosure provide techniques for beam failure detection and recovery. A method that may be performed by a user equipment (UE) includes monitoring one or more first reference signals to detect a beam failure for one or more first control resource sets (CORESETs), transmitting an indication of the beam failure, and receiving a beam failure response after the transmission of the indication of the beam failure, wherein the monitoring of the one or more first reference signals for the detection of the beam failure stops in response to the reception of the beam failure response. The UE may then receive a configuration message after the reception of the beam failure response, and monitor, in response to the reception of the configuration message, one or more second reference signals to detect another beam failure for one or more second CORESETs.

32 Claims, 7 Drawing Sheets

(51) Int. Cl.
*H04L 41/0654* (2022.01)
*H04L 41/0803* (2022.01)
*H04W 72/14* (2009.01)
*H04W 72/23* (2023.01)
*H04W 74/02* (2009.01)

(56) References Cited

OTHER PUBLICATIONS

MediaTek Inc. ("Summary 2 on Remaing issues on Beam Failure Recovery"; 3GPP TSG RAN WG1 Meeting #93; Busan, Korea, May 21-25, 2018; R1-1807796) (Year: 2018).*
International Search Report and Written Opinion—PCT/US2020/051245—ISA/EPO—Feb. 3, 2021.
Mediatek Inc: "Summary 2 on Remaining Issues on Beam Failure Recovery", 3GPP Draft, 3GPP TSG RAN WG1 Meeting #93, R1-1807796_Summary_BFR_V07, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 24, 2018 (May 24, 2018), XP051463405, 30 Pages.
NTT Docomo: "Remaining Issues on Beam Management", 3GPP TSG RAN WG1 Meeting #94, 3GPP Draft; R1-1809138 Maintenance for Beam Management, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 20, 2018-Aug. 24, 2018, Aug. 11, 2018 (Aug. 11, 2018), pp. 1-10, XP051516508, paragraph [03.1]; figure 3.
Partial International Search Report—PCT/US2020/051245—ISA/EPO—Dec. 4, 2020.

* cited by examiner

BEAM FAILURE DETECTION (BFD) BEHAVIOR AFTER RECEIVING BEAM FAILURE RECOVERY (BFR) RESPONSE

CROSS-REFERENCE TO RELATED APPLICATION

This application claims benefit of and priority to U.S. Provisional Application No. 62/904,947, filed Sep. 24, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for beam failure detection and recovery.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam failure detection and recovery operations.

Certain aspects provide a method for wireless communication by a user-equipment (UE). The method generally includes monitoring one or more first reference signals to detect a beam failure for one or more first control resource sets (CORESETs), transmitting an indication of the beam failure, and receiving a beam failure response after the transmission of the indication of the beam failure. In certain aspects, the monitoring of the one or more first reference signals for the detection of the beam failure stops in response to the reception of the beam failure response. The method may also include receiving a configuration message after the reception of the beam failure response, and monitoring, in response to the reception of the configuration message, one or more second reference signals to detect another beam failure for one or more second CORESETs.

Certain aspects provide a method for wireless communication by a UE. The method generally includes monitoring one or more first reference signals to detect a beam failure for one or more first CORESETs, transmitting an indication of the beam failure, receiving a beam failure response after the transmission of the indication of the beam failure, and monitoring, in response to the reception of the beam failure response, one or more second reference signals to detect another beam failure for one or more second CORESETs.

Certain aspects provide an apparatus for wireless communication by a UE. The apparatus generally includes a memory and one or more processors, the one or more processors and the memory being configured to monitor one or more first reference signals to detect a beam failure for one or more first CORESETs, and transmit an indication of the beam failure. The one or more processors and the memory may be further configured to receive a beam failure response after the transmission of the indication of the beam failure, wherein the monitoring of the one or more first reference signals for the detection of the beam failure stops in response to the reception of the beam failure response, and receive a configuration message after the reception of the beam failure response. The one or more processors and the memory may be further configured to monitor, in response to the reception of the configuration message, one or more second reference signals to detect another beam failure for one or more second CORESETs.

Certain aspects provide an apparatus for wireless communication by a UE. The apparatus generally includes a memory and one or more processors, the one or more processors and the memory being configured to monitor one or more first reference signals to detect a beam failure for one or more first CORESETs, a transmitter configured to transmit an indication of the beam failure, and a receiver configured to receive a beam failure response after the transmission of the indication of the beam failure. The one or more processors and the memory may be further configured to monitor, in response to the reception of the beam failure response, one or more second reference signals to detect another beam failure for one or more second CORESETs.

Certain aspects provide an apparatus for wireless communication by a UE. The method generally includes means for monitoring one or more first reference signals to detect a beam failure for one or more first CORESETs, and means for transmitting an indication of the beam failure, means for receiving a beam failure response after the transmission of the indication of the beam failure. The monitoring of the one or more first reference signals for the detection of the beam failure may stop in response to the reception of the beam failure response. The apparatus may also include means for receiving a configuration message after the reception of the beam failure response, and means for monitoring, in response to the reception of the configuration message, one or more second reference signals to detect another beam failure for one or more second CORESETs.

Certain aspects provide an apparatus for wireless communication by a UE. The method generally includes means for monitoring one or more first reference signals to detect a beam failure for one or more first CORESETs, means for transmitting an indication of the beam failure, means for receiving a beam failure response after the transmission of the indication of the beam failure, and means for monitoring, in response to the reception of the beam failure response, one or more second reference signals to detect another beam failure for one or more second CORESETs.

Certain aspects provide a computer-readable medium having instructions stored thereon to cause a UE to monitor one or more first reference signals to detect a beam failure for one or more first CORESETs, transmit an indication of the beam failure, and receive a beam failure response after the transmission of the indication of the beam failure. The monitoring of the one or more first reference signals for the detection of the beam failure may stop in response to the reception of the beam failure response. The computer-readable medium may have instructions stored thereon to further cause the UE to receive a configuration message after the reception of the beam failure response, and monitor, in response to the reception of the configuration message, one or more second reference signals to detect another beam failure for one or more second CORESETs.

Certain aspects provide a computer-readable medium having instructions stored thereon to cause a UE to monitor one or more first reference signals to detect a beam failure for one or more first CORESETs, transmit an indication of the beam failure, receive a beam failure response after the transmission of the indication of the beam failure, and monitor, in response to the reception of the beam failure response, one or more second reference signals to detect another beam failure for one or more second CORESETs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
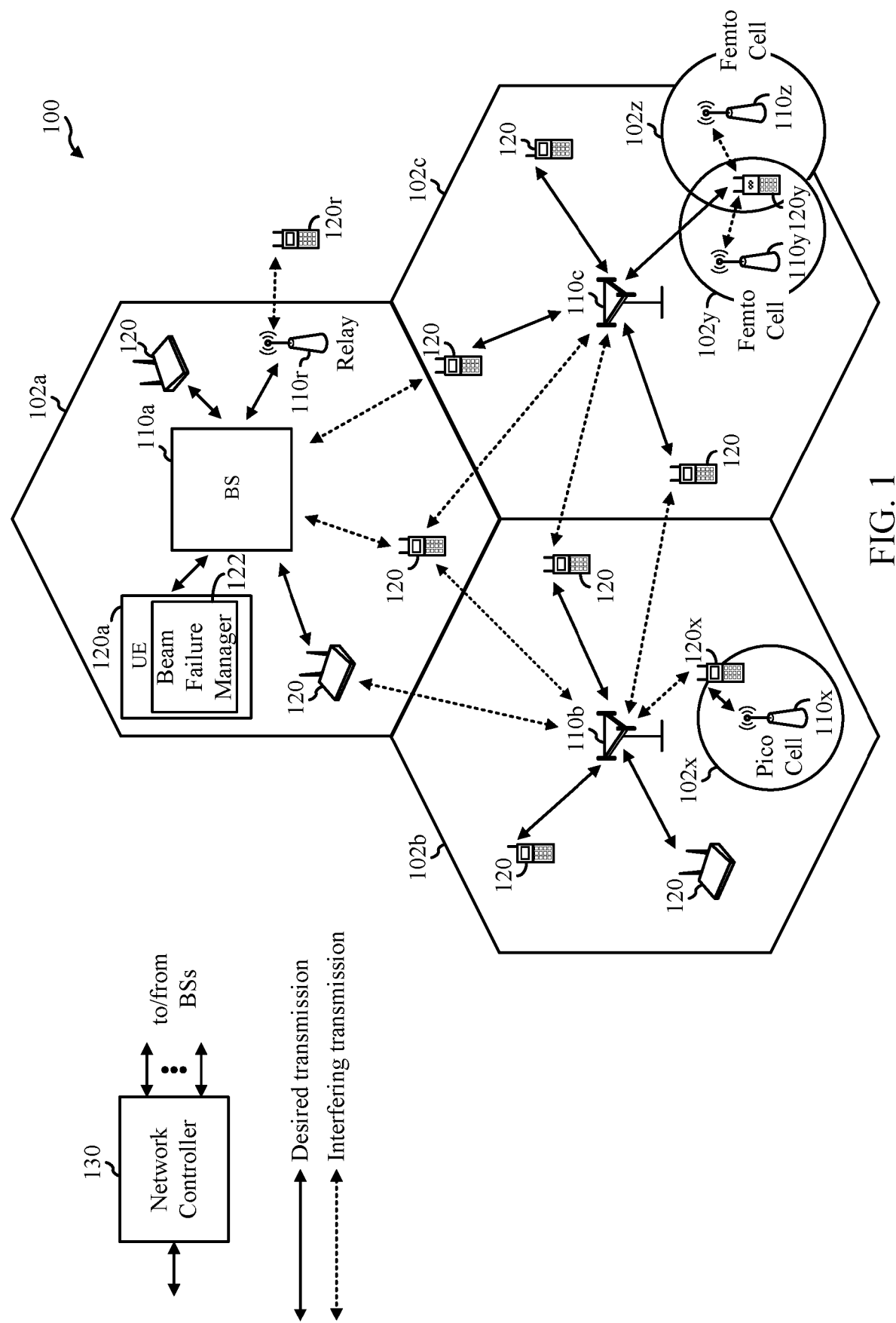
FIG. 1 is a block diagram conceptually illustrating an example telecommunications system, in accordance with certain aspects of the present disclosure.

Aspects of the present disclosure provide apparatus, methods, processing systems, and computer readable mediums for beam failure detection and recovery. For example, certain aspects of the present disclosure provide operations for performing a beam failure detection (BFD) upon reception of a beam failure recovery (BFR) response. In other words, once a beam failure is detected, a UE may transmit a beam failure recovery request (BFRQ) to a base station, in response to which the base station may transmit the BFR response. Once the BFR response is received, the UE may either stop monitoring reference signals for BFD, begin performing implicit BFD, or continue performing explicit BFD if explicit BFD has previously been configured at the UE, as described in more detail herein.

If the UE stops monitoring reference signals for BFD, the UE may once again begin monitoring reference signals for BFD if a configuration message is received by the UE that resets a beam associated with control resource sets (CORESETs) to be monitored for beam failure. For example, the UE may receive an explicit BFD configuration, in response to which the UE may begin performing explicit BFD operations.

If the UE begins implicit BFD in response to the reception of the BFD response, the UE may include, as part of the CORESETs being monitored for BFD, a CORESET configured at the UE for the reception of the BFD response. For example, if the UE continues monitoring the same CORESETs after detection of beam failure and reception of the BFR response, the UE may detect a new beam failure before a BFD-RS reconfiguration is received. Thus, by including the CORESET configured at the UE for the reception of the BFR response as part of the CORESETs being monitored after the reception of the BFR response, the detection of the new beam failure before reception of the BFD-RS reconfiguration may be avoided.

The following description provides examples of beam failure detection and recovery in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for beam failure management. As shown in FIG. 1, the UE 120a includes a beam failure manager 112. The beam failure manager 122 may be configured to perform beam failure detection and recovery operations, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
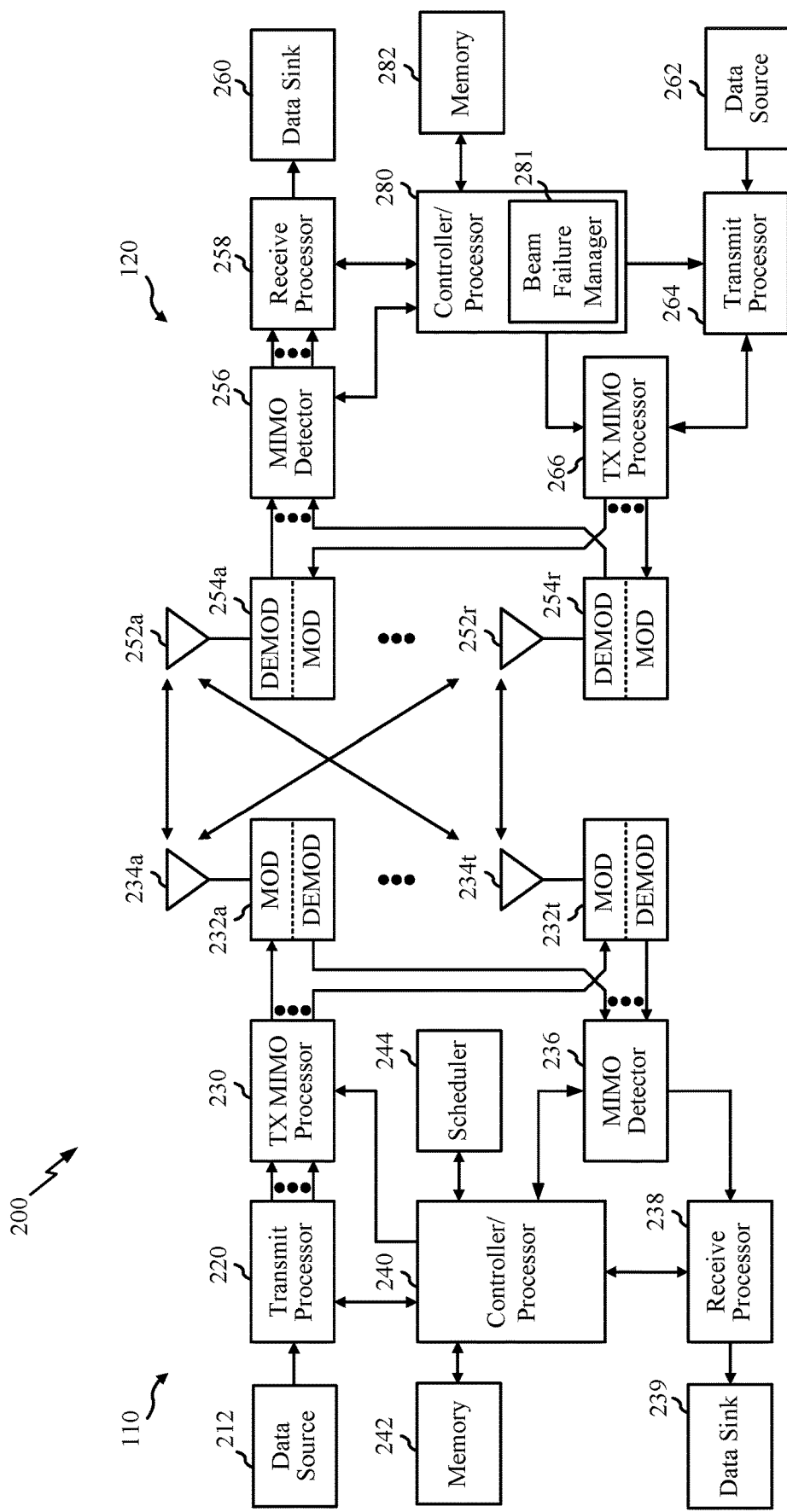
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a beam failure manager 281 that may be configured for beam failure and recovery operations, according to aspects described herein. Although shown at the Controller/Processor, other components of the UE 120a and BS 110a may be used performing the operations described herein.

Example Beam Failure Detection (BFD) Behavior after Receiving Beam Failure Recovery (BFR) Response Narrow-beam transmission and reception is useful for improving the link budget at millimeter-wave frequencies but may be susceptible to beam failure. A beam failure generally refers to a scenario in which the quality of a beam for control resource sets (CORESETs) falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Beam failure may be detected by monitoring a beam failure detection (BFD) reference signal (RS) and assessing if a beam failure trigger condition has been met. Beam failure detection is triggered if an estimated block error rate (BLER) of reference signals associated with all configured CORESET is above a threshold (e.g., 10%). To find candidate new beams, the UE may monitor a beam identification reference. When a UE has declared beam failure and found a new beam, the UE may transmit a beam failure recovery request (BFRQ) message to the serving BS. The BS responds to the request by transmitting a beam failure recovery (BFR) response (also referred to herein as a "beam failure response") over a CORESET (e.g., also referred to as a CORESET-BFR) to the UE and the UE monitors the CORESET for the response. If the response is received successfully, the beam recovery is completed and a new beam pair link may be established. If the UE cannot detect any response within a specific time period, the UE may perform a retransmission of the request. If the UE cannot detect any response after a specified number of retransmissions, then the UE may notify higher layers, potentially leading to RLF and cell reselection.

If an explicit BFD-RS is configured for beam failure detection, a UE may continue monitoring the explicit BFD-RS after receiving a BFR response. Thus, another BFR may be quickly triggered again by the explicit BFD-RSs before BFD-RS reconfiguration occurs because the explicit BFD-RSs correspond to the same beam for which the beam failure was previously detected. In other words, the UE may continue monitoring the same beams of the CORESETs (also referred to herein as "old CORESETs") for which beam failure was originally detected, and thus, may quickly detect a new beam failure until a BFD-RS reconfiguration is received.

On the other hand, if explicit BFD-RS is not configured, it is currently unclear whether the UE is to perform implicit BFD after receiving a BFR response and, if so, how to perform implicit BFD. For example, it is unclear whether a CORESET without transmission configuration indicator (TCI) state configured (e.g., CORESET-BFR) should be monitored for the implicit BFR. The CORESET-BFR is the CORESET configured for monitoring the BFD-response, as described herein. The use of the CORESET-BFR may be activated by a random access channel (RACH) procedure for beam failure recovery. Therefore, a TCI-state may not be configured for the CORESET-BFR. As used herein, an explicit BFD generally refers to BFD performed by monitoring configured references signals (e.g., configured via RRC signaling) for BFD, and an implicit BFD generally refers to BFD performed by monitoring reference signals of the configured TCI state for a corresponding CORESET.

Figure 3:
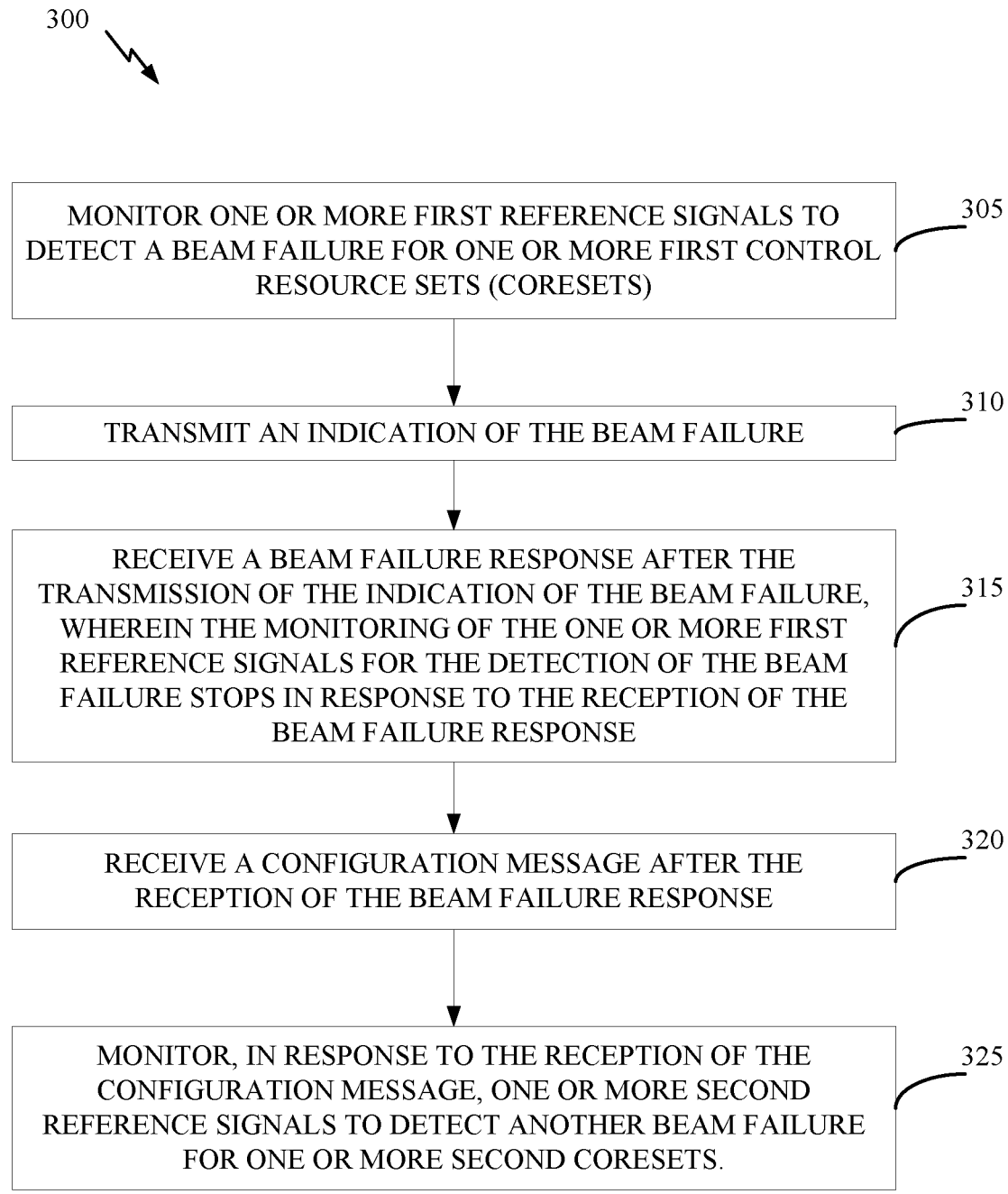
FIG. 3 is a flow diagram illustrating example operations for wireless communication, in accordance with certain aspects of the present disclosure.

FIG. 3 is a flow diagram illustrating example operations 300 for wireless communication, in accordance with certain aspects of the present disclosure. The operations 300 may be performed, for example, by UE (e.g., such as a UE 120a in the wireless communication network 100).

Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 may begin, at block 305, by a UE monitoring one or more first reference signals to detect a beam failure for one or more first CORESETs, at block 310, transmitting an indication of the beam failure, and at block 315, receiving a beam failure response (e.g., also referred to as a BFR response) after the transmission of the indication of the beam failure. In certain aspects, the monitoring of the one or more first reference signals for the detection of the beam failure stops in response to the reception of the beam failure response. At block 320, the UE may receive a configuration message after the reception of the beam failure response, and at block 325, monitor, in response to the reception of the configuration message, one or more second reference signals to detect another beam failure for one or more second CORESETs. For example, at least one beam used to monitor the one or more first reference signals may be different than at least one beam used to monitor the one or more second reference signals. In some cases, the configuration message may be a message configuring the at least one beam used to monitor the one or more second CORESETs.

In certain aspects, the configuration message may be a medium access control-control element (MAC-CE) activation command configuring a TCI state or modifying a list of one or more configured TCI states. That is, if explicit BFD-RS is not configured (e.g., the UE detects a beam failure while performing implicit BFD) and the UE receives a BFR response, the UE may stop BFD. UE may then begin implicit BFD in response to the UE receiving a MAC CE activation command for a TCI state or an indication to add a TCI-state for a physical downlink control channel (PDCCH) (e.g., via TCI-StatesPDCCH-ToAddlist field) and/or an indication to release a TCI-state for a PDCCH (e.g., via TCI-StatesPDCCH-ToReleaseList field). In other words, the UE then begins implicit BFD if any CORSET beam is reset and the UE uses the new CORESET beam to monitor the implicit BFD-RS.

In certain aspects, the configuration message may be a message configuring the one or more second reference signals for BFD. For example, the UE may also start explicit BFD if the UE receives an explicit BFD-RS configuration that configures RSs explicitly for BFD.

In some cases, an explicit BFD may be configured prior to the reception of the beam failure response. For example, the UE may receive a message configuring the one or more first reference signals for beam failure detection. The UE may stop BFD in response to reception of the BFR response, and begin implicit or explicit BFD, as described herein, in response to reception of the configuration message.

Figure 4:
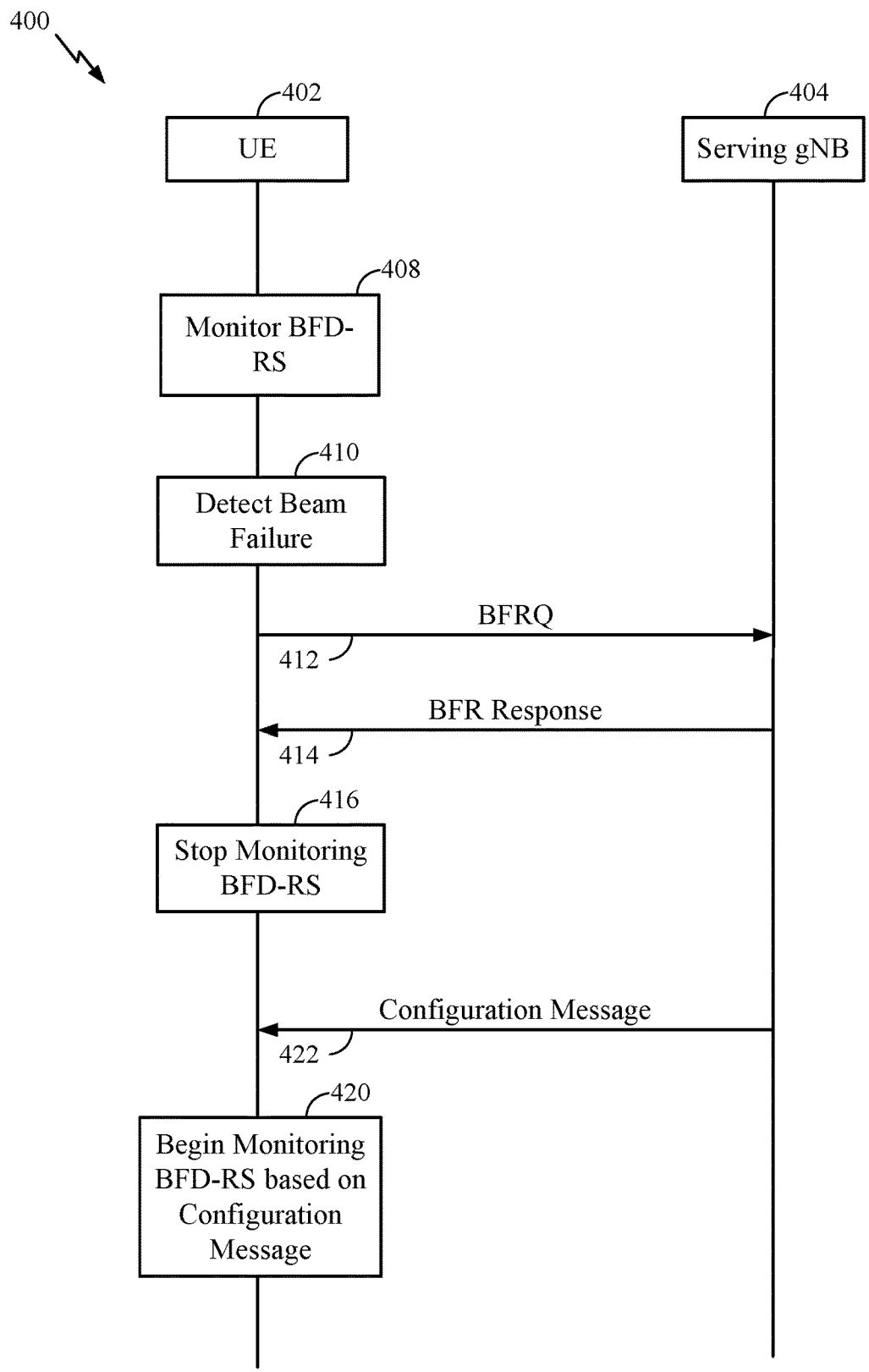
FIG. 4 is a call-flow diagram illustrating example operations for beam failure detection and recovery, in accordance with certain aspects of the present disclosure.

FIG. 4 is a call-flow diagram illustrating example operations 400 for beam failure detection and recovery, in accordance with certain aspects of the present disclosure. As illustrated, at block 408, the UE 402 may monitor BFD-RS which may be explicitly configured, or implicitly monitored by the UE, as described herein. At block 410, the UE may detect a beam failure, and transmit a BFRQ 412 to a serving BS 404, in response to which, the serving BS 404 may transmit and BFR response 414. In response to reception of the BFR response, the UE may stop monitoring the BFD-RS at block 416, until a configuration message 422 is received. In response to the reception of the configuration message 422, the UE may begin monitoring BFD-RS at block 420. For example, the configuration message 422 may configure an explicit BFD-RS to be monitored at block 420, or may reset a beam for preconfigured CORESETs, which may be used by the UE at block 420 for implicit BFD.

Figure 5:
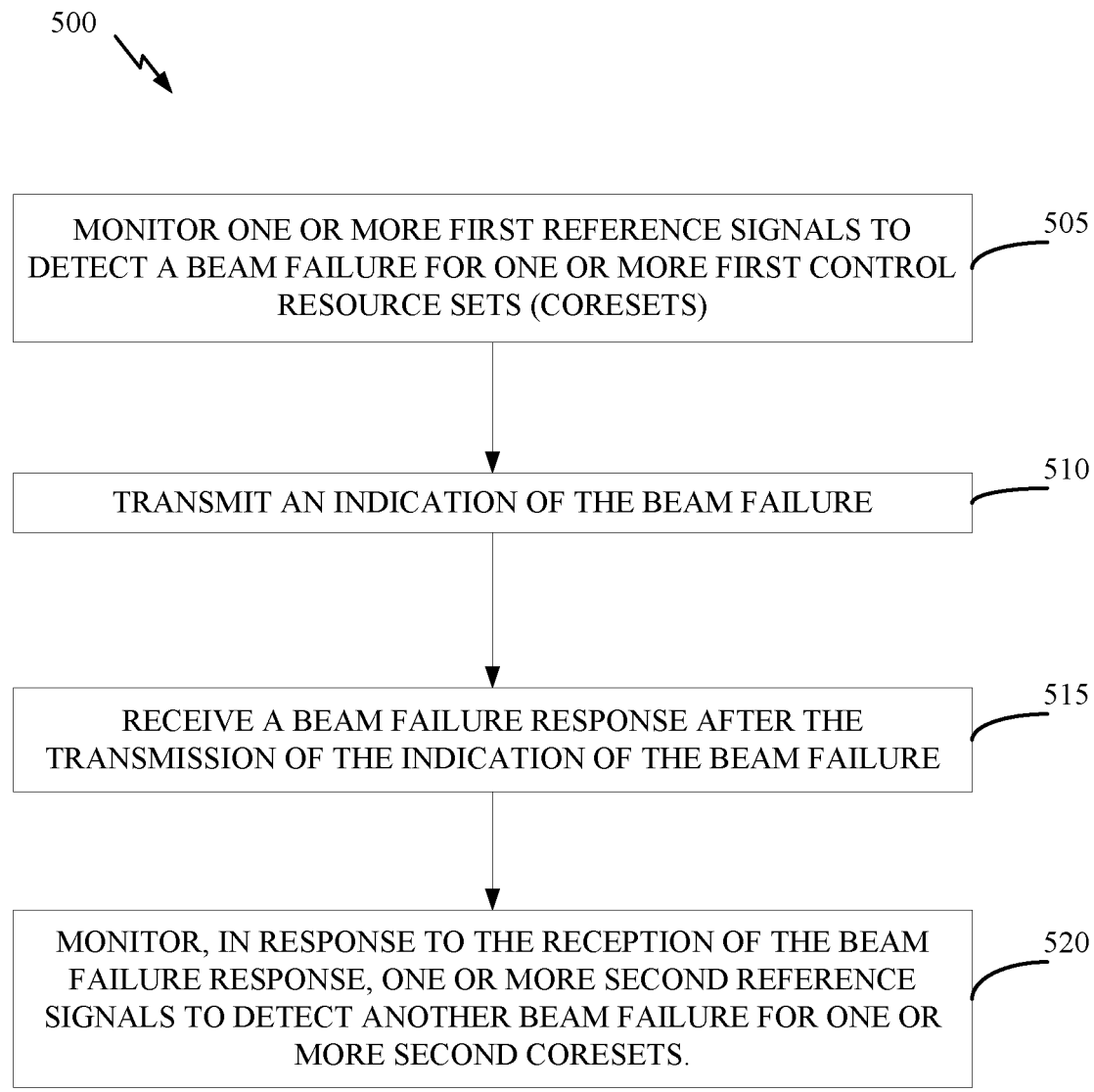
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100).

Operations 500 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by a UE monitoring one or more first reference signals to detect a beam failure for one or more first CORESETs, at block 510, transmitting an indication of the beam failure, and at block 515, receiving a beam failure response after the transmission of the indication of the beam failure. At block 520, the UE monitors, in response to the reception of the beam failure response, one or more second reference signals to detect another beam failure for one or more second CORESETs. In certain aspects, the one or more second reference signals includes a reference signal in a TCI state configured for a corresponding one of the one or more second CORESETs. In some cases, the one or more second reference signals may include a reference signal serving as a quasi-co location (QCL) source of a corresponding one of the one or more second CORESETs, the one of the one or more second CORESETs being without a configured TCI state. In certain aspects, at least one beam for monitoring the one or more second reference signals may be different than at least one beam used to monitor the one or more first reference signals.

For example, after receiving the BFD response, the UE may begin implicit BFD. When performing the implicit BFD, the UE may monitor references signals for various CORESETs including the CORESET-BFR (e.g., the CORESET without TCI state configured) during the implicit BFD. For example, a CORESET (e.g., CORESET-BFR) of the one or more second CORESETs may be configured for reception of the beam failure response. The use of the CORESET-BFR may be activated by a RACH procedure for beam failure recovery, as described herein.

The UE may monitor reference signals corresponding to CORESETs that were monitored by the UE prior to the detection of the beam failure, as well as reference signals corresponding to the BFR-CORESET. Generally, a beam failure may be detected by a UE if the estimated BLER of all the CORESETs being monitored is above a threshold (e.g., 10%), as described herein. However, the UE may continue monitoring one or more of the old CORESETs (e.g., the one or more first CORESETs in FIG. 5) for downlink control information (DCI), even though a beam failure was detected.

For UE with a limited quantity (N) of active TCI states, the UE may be unable to monitor old CORESETs (e.g., CORESETs being monitored before reception of the BFR response) with original TCI states because one of the active beams is used by the UE to monitor the CORESET-BFR (e.g., for reception of the BFR response). In certain aspects, the UE may determine the active beam to monitor old CORESETs. For instance, the UE may use N−1 remaining old active TCI state(s) for all old CORESETs (e.g., since one of the active TCI states (e.g., beam) is used to monitor the CORESET-BFR). In other words, when the UE is limited to a quantity of N active TCI-states, at least one other CORESET of the one or more second CORESETs may be monitored using N−1 active TCI-states by the UE. The at least one other CORESET of the one or more second CORESETs may be the same as the one or more first CORESETs (e.g., old CORESETs). In certain aspects, a detailed reassignment rule may be specified in the specification or up to UE implementation. In other words, the remaining N−1 active TCI state(s) may be assigned by specification, or UE implementation, to the old CORESETs for monitoring of DCI.

In certain aspects, the UE may use the QCL (e.g., beam or spatial relationship) of the CORESET-BFR at least for all CORESETs being monitored for beam failure, and potentially for all physical downlink shared channels (PDSCH) being monitored. For example, the QCL for the CORESET-BFR may be configured by the RACH procedure used to configure the CORESET-BFR, and may be used for monitoring all CORESETs. For instance, the same beam may be used to monitor the CORESET-BFR, as well as the old CORESETs, and in certain aspects, for monitoring PDSCH. In certain aspect, the CORESET without TCI state configured (e.g., CORESET-BFR) may not be included (e.g., monitored) in implicit BFD.

In certain aspects, the UE may receive a configuration message, where the one or more second reference signals are monitored until the configuration message is received. The UE may then monitor, in response to the reception of the configuration message, one or more third reference signals for beam failure detection in response to the reception of the configuration message. For example, the UE may update the implicit BFD-RS after the UE receives a MAC CE activation command for a TCI state or any TCI state list modification parameter such as TCI-StatesPDCCH-ToAddlist parameter for adding a TCI state to the list and/or TCI-StatesPDCCH-ToReleaseList parameter for releasing a TCI state from the list. For example, the UE may stop monitoring the CORESET-BFR, and monitor the newly configured CORESETs via the explicit BFD-RS configuration, or activation command. In certain aspects, the UE may begin explicit BFD after the UE receives new explicit BFD-RS configuration.

In certain aspects, if explicit BFD-RS is configured before and the UE has received BFR response, the UE may stop BFD or perform implicit BFD, as described herein. In some cases, the UE may continue monitoring the explicit BFD-RS configured before the reception of the BFR response. For example, the UE may receive a message configuring the one or more first reference signals for beam failure detection. In this case, the one or more second reference signals monitored after the reception of the beam failure response may include the one or more first reference signals configured by the message.

Figure 6:
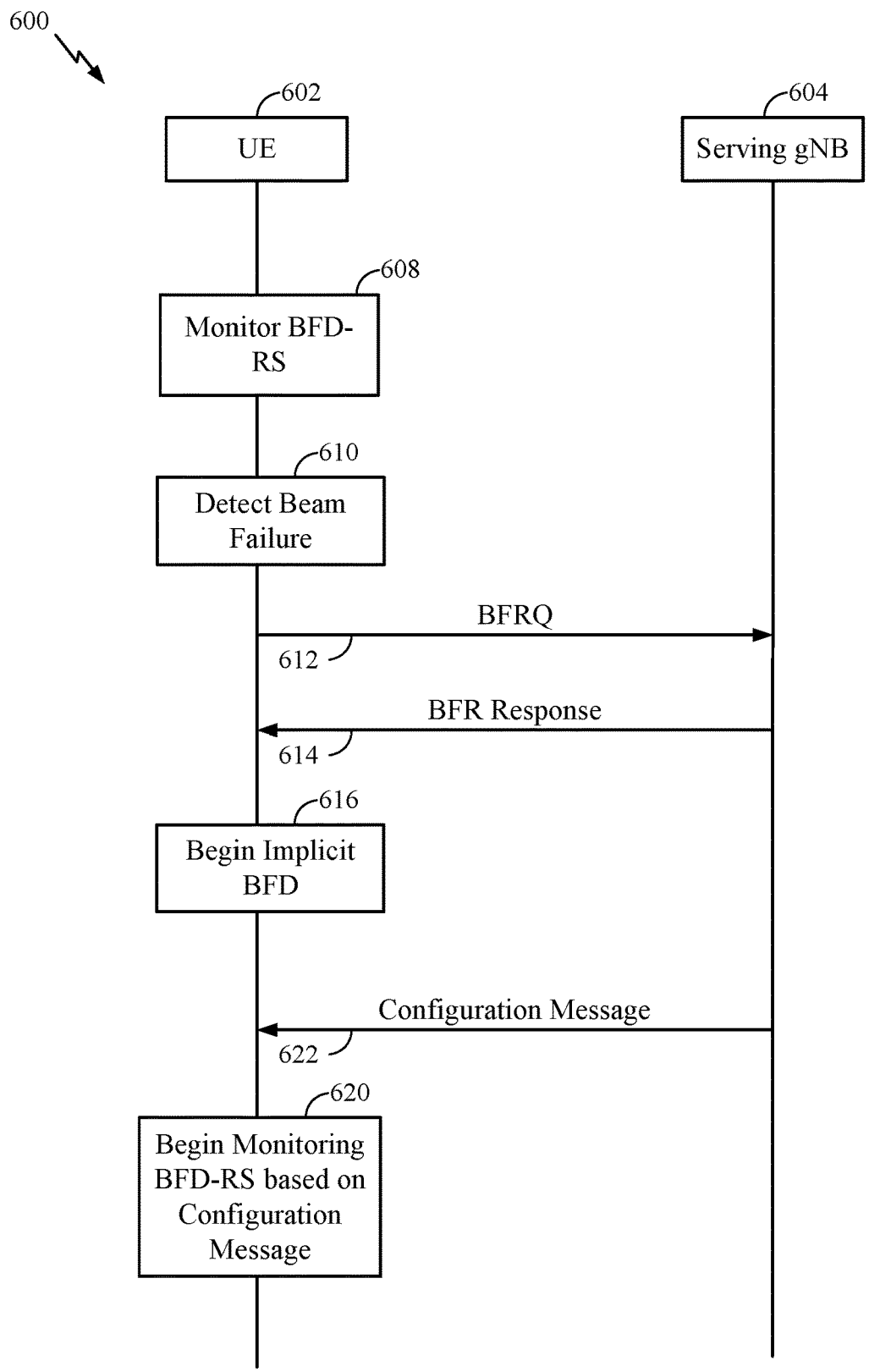
FIG. 6 is a call-flow diagram illustrating example operations for wireless communication, in accordance with certain aspects of the present disclosure.

FIG. 6 is a call-flow diagram illustrating example operations 600 for wireless communication, in accordance with certain aspects of the present disclosure. As illustrated, at block 608, the UE 602 may monitor BFD-RS, and at block 610, detect a beam failure. The BFD-RS may be an explicitly configured RS for BFD, or implicitly monitored by the UE, as described herein. The UE may then transmit a BFRQ 612 to the serving BS 604, in response to which the serving BS 604 may transmit a BFR response 614. At block 616, in response to the reception of the BFR response 614, the UE may begin implicit BFD. In certain aspects, the UE may receive a configuration message 622, as described herein. The UE may then begin, at block 620, monitoring BFD-RS based on the configuration message.

In Dual Connectivity, two MAC entities may be configured in the UE: one for the Master Cell Group (MCG) and one for the Secondary Cell Group (SCG). Each MAC entity may be configured by RRC with a serving cell supporting physical uplink control channel (PUCCH) transmission and contention based Random Access. The term special cell (SpCell) may refer to such cell, whereas the term secondary cell (SCell) refers to other serving cells. The term SpCell either refers to the primary cell (PCell) of the MCG or the primary secondary cell (PSCell) of the SCG depending on if the MAC entity is associated to the MCG or the SCG, respectively.

The aspects described herein may be applicable to both SPCell and SCell BFR procedure, where the BFR responses are defined based on SPCELL BFR or SCell BFR procedure. For example, for SPCell BFR, the BFR response is a DCI format with cyclic redundancy check (CRC) scrambled by Cell-Radio Network Temporary Identifier (C-RNTI) or modulation and coding scheme (MCS)-C-RNTI in the search space set provided by the recovery search space identifier (recoverySearchSpaceId) after BFRQ transmission, which may be contention-free random access (CFRA) preamble transmission on SPCell. For example, for the SPCell BFR procedure, once UE detects beam failure, the UE may use the CFRA procedure to send RACH preamble to SPCell, the RACH preamble indicating the BFR request. Then the UE may monitor the recovery search space. Once the UE detects a DCI on the recovery search space scrambled with C-RNTI or MCS-C-RNTI, then the UE determines that the DCI is the BFR response. For the SCell BFR procedure, the BFR response may be a normal uplink grant scrambled with C-RNTI/MCS-C-RNTI after BFRQ transmission, which may be a dedicated scheduling request (SR) transmission on any Cell (e.g., SpCell). For example, the UE may transmit the BFRQ using a dedicated SR transmission on any Cell using uplink resources. In response to the BFRQ, the cell (e.g., SpCell) may transmit the uplink grant scrambled with C-RNTI or MCS-C-RNTI, in response to which the UE may transmit a detailed BFR report (also referred to herein as a "beam failure report") to the cell.

In certain aspects, for the SCell BFR procedure, the BFR response may be a normal uplink grant to schedule a new transmission for the same HARQ process as PUSCH carrying the MAC CE carrying the BFR report transmission, which may be transmitted on any Cell and in an UL grant possibly triggered by BFRQ. In other words, after UE sends a SR transmission, the UE may receive an uplink grant which is triggered by the BFRQ transmission. Using the UL grant, the UE may transmit a MAC-CE indicating the BFR report (e.g., indicating which beam failed). In this case, the BFR response may be a normal uplink grant scheduling a new transmission for the same HARQ process as the PUSCH carrying the MAC-CE. In other words, the UE may receive an acknowledgment for the uplink MAC-CE transmission, and the acknowledgment may serve as the BFR response. For example, the scheduling of a new transmission via the uplink grant may imply to the UE that MAC-CE carrying the BFR report was received successfully by the base station (e.g., the uplink grant may serve as the acknowledgement of the MAC-CE). In certain aspects, if a periodic uplink scheduling (e.g., semi-persistent scheduling (SPS)) has been configured, the UE may forgo the SR transmission, and instead, transmit the MAC-CE using the preconfigured uplink grant.

Figure 7:
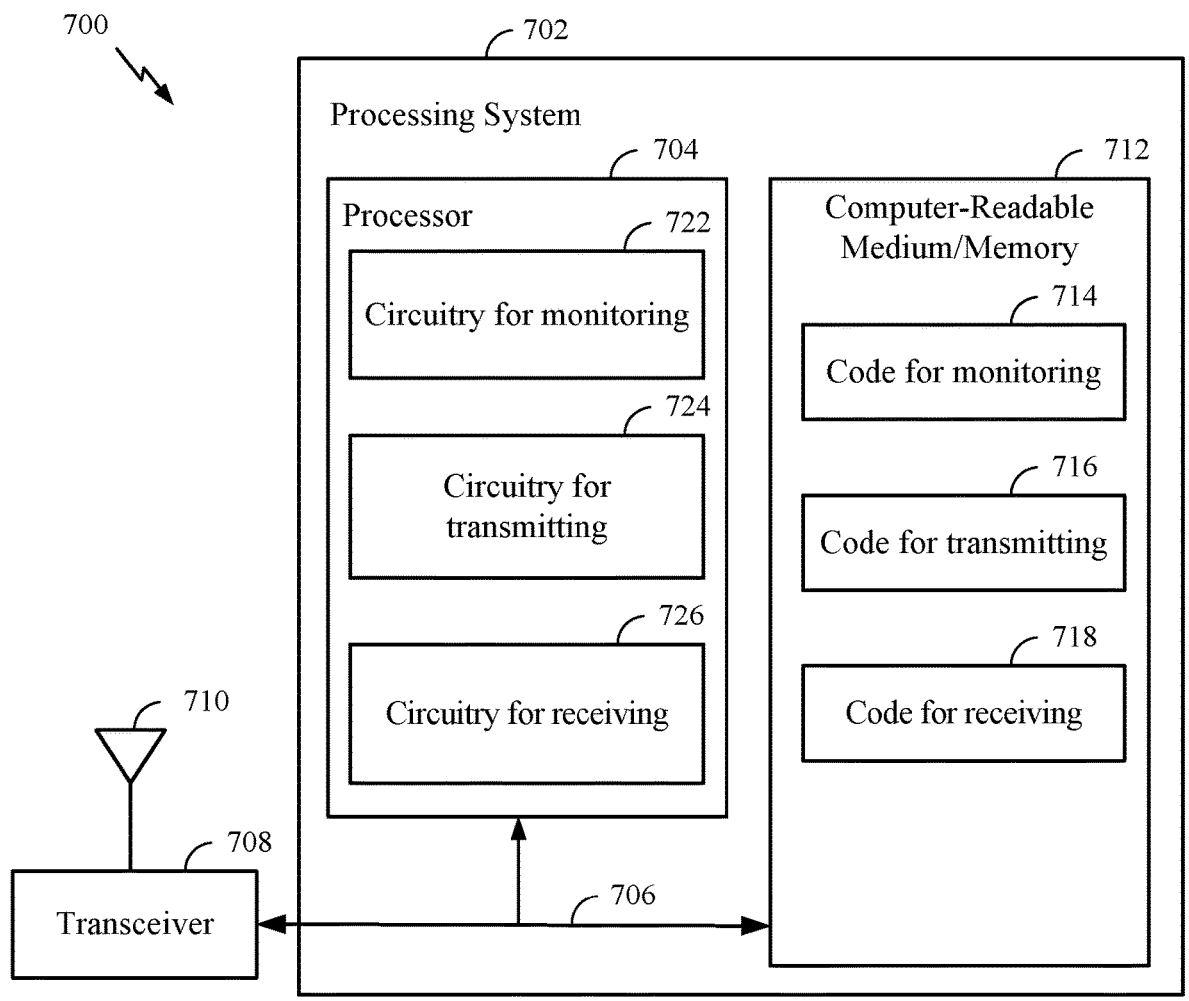
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIGS. 3 and 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIGS. 3 and 5, or other operations for performing the various techniques discussed herein for beam failure detection and recovery.

In certain aspects, computer-readable medium/memory 712 stores code 714 (e.g., an example of means for) for monitoring; code 716 (e.g., an example of means for) for transmitting, and code 718 (e.g., an example of means for) for receiving. One or more of code 714, 716, may be executed by a general-purpose processor, a digital signal processor (DSP), an application-specific integrated circuit (ASIC), a field programmable gate array (FPGA) or other programmable logic device. In certain aspects, the processor 804 executes the code stored in the computer-readable medium/memory 812. In certain aspects, computer-readable medium/memory 812 is an example of the beam failure manager 122.

In certain aspects, alternatively or additionally, processor 704 includes circuitry 722 (e.g., an example of means for) for monitoring; circuitry 724 (e.g., an example of means for) for transmitting; and circuitry 726 (e.g., an example of means for) for receiving. One or more of circuitry 722, 724, 726 may be implemented by one or more of a general-purpose processor, a DSP, an ASIC, a FPGA or other programmable logic device. In certain aspects, processor 804 is an example of the beam failure manager 122.

The beam failure manager 122 may support wireless communication in accordance with examples as disclosed herein.

The beam failure manager 122 may be an example of means for performing various aspects described herein. The beam failure manager 122, or its sub-components, may be implemented in hardware (e.g., in beam failure management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the beam failure manager 122, or its sub-components, may be implemented in code (e.g., as beam failure management software or firmware) executed by a processor, or any combination thereof. If implemented in code executed by a processor, the functions of the beam failure manager 122, or its sub-components may be executed by a general-purpose processor, a DSP, an ASIC, a FPGA or other programmable logic device.

In some examples, the beam failure manager 122 may be configured to perform various operations (e.g., receiving, determining, transmitting) using or otherwise in cooperation with the transceiver 808.

The beam failure manager 122, or its sub-components, may be physically located at various positions, including being distributed such that portions of functions are implemented at different physical locations by one or more physical components. In some examples, the beam failure manager 122, or its sub-components, may be a separate and distinct component in accordance with various aspects of the present disclosure. In some examples, the beam failure manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1: A method for wireless communication by a user equipment (UE), comprising: monitoring one or more first reference signals to detect a beam failure for one or more first control resource sets (CORESETs); transmitting an indication of the beam failure; receiving a beam failure response after the transmission of the indication of the beam failure, wherein the monitoring of the one or more first reference signals for the detection of the beam failure stops in response to the reception of the beam failure response; receiving a configuration message after the reception of the beam failure response; and monitoring, in response to the reception of the configuration message, one or more second reference signals to detect another beam failure for one or more second CORESETs.

Aspect 2: The method of Aspect 1, wherein at least one beam used to monitor the one or more first reference signals is different than at least one beam used to monitor the one or more second reference signals.

Aspect 3: The method of Aspect 2, wherein the configuration message comprises a message configuring the at least one beam used to monitor the one or more second CORESETs.

Aspect 4: The method of Aspect 3, wherein the configuration message comprises a medium access control-control element (MAC-CE) activation command configuring a transmission configuration indicator (TCI)-state or modifying a list of one or more configured TCI-states.

Aspect 5: The method of any one of Aspects 1-4, wherein the configuration message comprises a message configuring the one or more second reference signals for beam failure detection (BFD).

Aspect 6: The method of any one of Aspects 1-5, wherein the beam failure response comprises downlink control information (DCI) having a cyclic redundancy check (CRC) scrambled by Cell-Radio Network Temporary Identifier (C-RNTI) or modulation and coding scheme (MCS)-C-RNTI.

Aspect 7: The method of Aspect 6, wherein the indication of the beam failure comprises a beam failure recovery request (BFRQ) transmitted using a contention-free random access (CFRA) preamble on a special cell (SpCell).

Aspect 8: The method of any one of Aspects 1-7, wherein the beam failure response comprises an uplink grant having a CRC scrambled with C-RNTI or MCS-C-RNTI.

Aspect 9: The method of Aspect 8, wherein the indication of the beam failure comprises a scheduling request (SR) transmission, the uplink grant being in response to the SR transmission.

Aspect 10: The method of any one of Aspects 1-9, further comprising transmitting a beam failure report after the transmission of the indication of the beam failure, the received beam failure response comprising an uplink grant transmitted in response to the beam failure report.

Aspect 11: The method of Aspect 10, wherein the uplink grant acknowledges that the beam failure report was received successfully.

Aspect 12: The method of any one of Aspects 1-11, further comprising receiving a message configuring the one or more first reference signals for beam failure detection.

Aspect 13: The method of any one of Aspects 1-12, wherein at least one of the one or more first CORESETs is different than at least one of the one or more second CORESETs.

Aspect 14: A method for wireless communication by a user equipment (UE), comprising: monitoring one or more first reference signals to detect a beam failure for one or more first control resource sets (CORESETs); transmitting an indication of the beam failure; receiving a beam failure response after the transmission of the indication of the beam failure; and monitoring, in response to the reception of the beam failure response, one or more second reference signals to detect another beam failure for one or more second CORESETs.

Aspect 15: The method of Aspect 14, wherein the one or more second reference signals comprises one reference signal in a transmission configuration indicator (TCI) state configured for a corresponding one of the one or more second CORESETs.

Aspect 16: The method of any one of Aspects 14-15, wherein the one or more second reference signals comprises a reference signal serving as a quasi-co location (QCL)

source of a corresponding one of the one or more second CORESETs, the one of the one or more second CORESETs being without a configured TCI state.

Aspect 17: The method of any one of Aspects 14-16, wherein at least one beam for monitoring the one or more second reference signals is different than at least one beam used to monitor the one or more first reference signals.

Aspect 18: The method of any one of Aspects 14-17, wherein a CORESET of the one or more second CORESETs is configured for reception of the beam failure response.

Aspect 19: The method of Aspect 18, wherein use of the CORESET is activated by a random access channel (RACH) procedure for beam failure recovery.

Aspect 20: The method of any one of Aspects 18-19, wherein the CORESET is without a transmission configuration indicator (TCI) state.

Aspect 21: The method of any one of Aspects 18-20, wherein the UE is limited to a quantity of N active TCI-states, and wherein at least one other CORESET of the one or more second CORESETs are monitored using N−1 active TCI-states by the UE, N being an integer greater than 1.

Aspect 22: The method of Aspect 21, wherein the at least one other CORESET of the one or more second CORESETs is the same as the one or more first CORESETs.

Aspect 23: The method of any one of Aspects 18-22, wherein the CORESET configured for reception of the beam failure response and at least one other CORESET of the one or more second CORESETs are monitored using the same beam.

Aspect 24: The method of Aspect 23, wherein the at least one other CORESET of the one or more second CORESETs is the same as the one or more first CORESETs.

Aspect 25: The method of any one of Aspects 14-24, further comprising: receiving a configuration message, wherein the one or more second reference signals are monitored until the configuration message is received; and monitoring, in response to the reception of the configuration message, one or more third reference signals for beam failure detection in response to the reception of the configuration message.

Aspect 26: The method of any one of Aspects 14-26, wherein the beam failure response comprises downlink control information (DCI) having a cyclic redundancy check (CRC) scrambled by Cell-Radio Network Temporary Identifier (C-RNTI) or modulation and coding scheme (MCS)-C-RNTI.

Aspect 27: The method of Aspect 26, wherein the indication of the beam failure comprises a beam failure recovery request transmitted using a contention-free random access (CFRA) preamble on a special cell (SpCell).

Aspect 28: The method of any one of Aspects 14-27, wherein the beam failure response comprises an uplink grant having a CRC scrambled with C-RNTI or MCS-C-RNTI.

Aspect 29: The method of Aspect 28, wherein the indication of the beam failure comprises a scheduling request (SR) transmission, the uplink grant being in response to the SR transmission.

Aspect 30: The method of any one of Aspects 14-29, further comprising transmitting a beam failure report after the transmission of the indication of the beam failure, the received beam failure response comprising an uplink grant transmitted in response to the beam failure report.

Aspect 31: The method of Aspect 30, wherein the uplink grant acknowledges that the beam failure report was received successfully.

Aspect 32: The method of any one of Aspects 14-31, further comprising receiving a message configuring the one or more first reference signals for beam failure detection.

Aspect 33: The method of Aspect 32, wherein the one or more second reference signals monitored after the reception of the beam failure response comprise the one or more first reference signals configured by the message.

Aspect 34: The method of any one of Aspects 14-33, wherein at least one of the one or more first CORESETs is different than at least one of the one or more second CORESETs.

Aspect 35: An apparatus for wireless communication by a user equipment (UE), comprising: a memory; and one or more processors coupled to the memory, the one or more processors and the memory being configured to: monitor one or more first reference signals to detect a beam failure for one or more first control resource sets (CORESETs); transmit an indication of the beam failure; receive a beam failure response after the transmission of the indication of the beam failure, wherein the monitoring of the one or more first reference signals for the detection of the beam failure stops in response to the reception of the beam failure response; receive a configuration message after the reception of the beam failure response; and monitor, in response to the reception of the configuration message, one or more second reference signals to detect another beam failure for one or more second CORESETs.

Aspect 36: An apparatus for wireless communication by a user equipment (UE), comprising: a memory; and one or more processors coupled to the memory, the one or more processors and the memory being configured to: monitor one or more first reference signals to detect a beam failure for one or more first control resource sets (CORESETs); transmit an indication of the beam failure; receive a beam failure response after the transmission of the indication of the beam failure; and monitor, in response to the reception of the beam failure response, one or more second reference signals to detect another beam failure for one or more second CORESETs.

Aspect 37: An apparatus for wireless communication by a user equipment (UE), comprising: means for monitoring one or more first reference signals to detect a beam failure for one or more first control resource sets (CORESETs); means for transmitting an indication of the beam failure; means for receiving a beam failure response after the transmission of the indication of the beam failure, wherein the monitoring of the one or more first reference signals for the detection of the beam failure stops in response to the reception of the beam failure response; means for receiving a configuration message after the reception of the beam failure response; and means for monitoring, in response to the reception of the configuration message, one or more second reference signals to detect another beam failure for one or more second CORESETs.

Aspect 38: An apparatus for wireless communication by a user equipment (UE), comprising: means for monitoring one or more first reference signals to detect a beam failure for one or more first control resource sets (CORESETs); means for transmitting an indication of the beam failure; means for receiving a beam failure response after the transmission of the indication of the beam failure; and means for monitoring, in response to the reception of the beam failure response, one or more second reference signals to detect another beam failure for one or more second CORESETs.

Aspect 39: A computer-readable medium having instructions stored thereon to cause a user equipment (UE) to: monitor one or more first reference signals to detect a beam failure for one or more first control resource sets (CORESETs); transmit an indication of the beam failure; receive a beam failure response after the transmission of the indication of the beam failure, wherein the monitoring of the one or more first reference signals for the detection of the beam failure stops in response to the reception of the beam failure response; receive a configuration message after the reception of the beam failure response; and monitor, in response to the reception of the configuration message, one or more second reference signals to detect another beam failure for one or more second CORESETs.

Aspect 40: A computer-readable medium having instructions stored thereon to cause a user equipment (UE) to: monitor one or more first reference signals to detect a beam failure for one or more first control resource sets (CORESETs); transmit an indication of the beam failure; receive a beam failure response after the transmission of the indication of the beam failure; and monitor, in response to the reception of the beam failure response, one or more second reference signals to detect another beam failure for one or more second CORESETs.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3 and 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
monitoring one or more first reference signals to detect a beam failure for one or more first control resource sets (CORESETs), wherein the beam failure is detected based on a block error rate (BLER) of the one or more first reference signals;
transmitting an indication of the beam failure;
transmitting a beam failure report after the transmission of the indication of the beam failure;
receiving a beam failure response after the transmission of the indication of the beam failure, wherein the monitoring of the one or more first reference signals for the detection of the beam failure stops in response to the reception of the beam failure response;
receiving a configuration message after the reception of the beam failure response; and
monitoring, in response to the reception of the configuration message, one or more second reference signals to detect another beam failure for one or more second CORESETs.

2. The method of claim 1, wherein at least one beam used to monitor the one or more first reference signals is different than at least one beam used to monitor the one or more second reference signals.

3. The method of claim 2, wherein the configuration message comprises a message configuring the at least one beam used to monitor the one or more second CORESETs.

4. The method of claim 1, wherein the configuration message comprises a message configuring the one or more second reference signals for beam failure detection (BFD).

5. The method of claim 1, wherein the beam failure response comprises downlink control information (DCI) having a cyclic redundancy check (CRC) scrambled by Cell-Radio Network Temporary Identifier (C-RNTI) or modulation and coding scheme (MCS)-C-RNTI.

6. The method of claim 1, wherein the beam failure response comprises an uplink grant having a CRC scrambled with C-RNTI or MCS-C-RNTI.

7. The method of claim 1, wherein the received beam failure response comprises an uplink grant transmitted in response to the beam failure report.

8. The method of claim 7, wherein the uplink grant acknowledges that the beam failure report was received successfully.

9. The method of claim 1, further comprising receiving a message configuring the one or more first reference signals for beam failure detection.

10. The method of claim 1, wherein the indication of the beam failure comprises a beam failure recovery request (BFRQ) transmitted using a contention-free random access (CFRA) preamble on a special cell (SpCell).

11. The method of claim 1, wherein the beam failure report indicates the beam associated with the beam failure.

12. A method for wireless communication by a user equipment (UE), comprising:
monitoring one or more first reference signals to detect a beam failure for one or more first control resource sets (CORESETs), wherein the beam failure is detected based on a block error rate (BLER) of the one or more first reference signals;
transmitting an indication of the beam failure;
transmitting a beam failure report after the transmission of the indication of the beam failure;
receiving a beam failure response after the transmission of the indication of the beam failure; and
monitoring, in response to the reception of the beam failure response, one or more second reference signals to detect another beam failure for one or more second CORESETs.

13. The method of claim 12, wherein the one or more second reference signals comprises one reference signal in a transmission configuration indicator (TCI) state configured for a corresponding one of the one or more second CORESETs.

14. The method of claim 12, wherein the one or more second reference signals comprises a reference signal serving as a quasi-co location (QCL) source of a corresponding one of the one or more second CORESETs, the one of the one or more second CORESETs being without a configured TCI state.

15. The method of claim 12, wherein at least one beam for monitoring the one or more second reference signals is different than at least one beam used to monitor the one or more first reference signals.

16. The method of claim 12, wherein a CORESET of the one or more second CORESETs is configured for reception of the beam failure response.

17. The method of claim 16, wherein the CORESET is without a transmission configuration indicator (TCI) state.

18. The method of claim 16, wherein the UE is limited to a quantity of N active TCI-states, and wherein at least one other CORESET of the one or more second CORESETs are monitored using N-1 active TCI-states by the UE, N being an integer greater than 1.

19. The method of claim 18, wherein the at least one other CORESET of the one or more second CORESETs is the same as the one or more first CORESETs.

20. The method of claim 16, wherein the CORESET configured for reception of the beam failure response and at least one other CORESET of the one or more second CORESETs are monitored using the same beam.

21. The method of claim 20, wherein the at least one other CORESET of the one or more second CORESETs is the same as the one or more first CORESETs.

22. The method of claim 12, further comprising:
receiving a configuration message, wherein the one or more second reference signals are monitored until the configuration message is received; and
monitoring, in response to the reception of the configuration message, one or more third reference signals for beam failure detection in response to the reception of the configuration message.

23. The method of claim 12, wherein the beam failure response comprises downlink control information (DCI) having a cyclic redundancy check (CRC) scrambled by Cell-Radio Network Temporary Identifier (C-RNTI) or modulation and coding scheme (MCS)-C-RNTI.

24. The method of claim 12, wherein the beam failure response comprises an uplink grant having a CRC scrambled with C-RNTI or MCS-C-RNTI.

25. The method of claim 12, wherein the received beam failure response comprises an uplink grant transmitted in response to the beam failure report.

26. The method of claim 25, wherein the uplink grant acknowledges that the beam failure report was received successfully.

27. The method of claim 12, further comprising receiving a message configuring the one or more first reference signals for beam failure detection.

28. The method of claim 27, wherein the one or more second reference signals monitored after the reception of the beam failure response comprise the one or more first reference signals configured by the message.

29. The method of claim 12, wherein the indication of the beam failure comprises a beam failure recovery request transmitted using a contention-free random access (CFRA) preamble on a special cell (SpCell).

30. The method of claim 12, wherein the beam failure report indicates the beam associated with the beam failure.

31. An apparatus for wireless communication by a user equipment (UE), comprising:
a memory; and
one or more processors coupled to the memory, the memory comprising instructions executable by the one or more processors to cause the apparatus to:
monitor one or more first reference signals to detect a beam failure for one or more first control resource sets (CORESETs), wherein the beam failure is detected based on a block error rate (BLER) of the one or more first reference signals;
transmit an indication of the beam failure;
transmit a beam failure report after the transmission of the indication of the beam failure;
receive a beam failure response after the transmission of the indication of the beam failure, wherein the monitoring of the one or more first reference signals for the detection of the beam failure stops in response to the reception of the beam failure response;
receive a configuration message after the reception of the beam failure response; and
monitor, in response to the reception of the configuration message, one or more second reference signals to detect another beam failure for one or more second CORESETs.

32. An apparatus for wireless communication by a user equipment (UE), comprising:
a memory; and
one or more processors coupled to the memory, the memory comprising instructions executable by the one or more processors to cause the apparatus to:
monitor one or more first reference signals to detect a beam failure for one or more first control resource sets (CORESETs), wherein the beam failure is detected based on a block error rate (BLER) of the one or more first reference signals;
transmit an indication of the beam failure;
transmit a beam failure report after the transmission of the indication of the beam failure;
receive a beam failure response after the transmission of the indication of the beam failure; and
monitor, in response to the reception of the beam failure response, one or more second reference signals to detect another beam failure for one or more second CORESETs.

* * * * *